United States Patent [19]

Hessenberger et al.

[11] Patent Number: 5,294,874
[45] Date of Patent: Mar. 15, 1994

[54] DYNAMIC BRAKE CIRCUIT FOR AN ELECTRIC MOTOR

[75] Inventors: Jeffrey C. Hessenberger, Waukesha; Michael R. West, Hartland, both of Wis.

[73] Assignee: Milwaukee Electric Tool Corporation, Brookfield, Wis.

[21] Appl. No.: 929,791

[22] Filed: Aug. 13, 1992

[51] Int. Cl.$^5$ .............................. H02P 3/00
[52] U.S. Cl. ..................... 318/759; 318/375; 318/245
[58] Field of Search ............... 318/375, 376, 758–763, 318/362, 380, 378, 379, 245

[56] References Cited

U.S. PATENT DOCUMENTS

| | | | |
|---|---|---|---|
| 3,305,714 | 2/1967 | Plumpe, Jr. | 318/759 |
| 3,341,758 | 9/1967 | Plumpe, Jr. | 318/759 |
| 3,541,411 | 11/1970 | Sharp | 318/758 |
| 3,548,276 | 12/1970 | Gross | 318/759 |
| 3,798,523 | 3/1974 | Gross | 318/758 |
| 3,872,363 | 3/1975 | Gross | 318/375 |
| 3,899,041 | 8/1975 | Mager | 180/65 R |
| 3,983,465 | 9/1976 | Tsuboi et al. | 318/376 |
| 4,087,727 | 5/1978 | Horiuchi et al. | 318/376 |
| 4,096,423 | 6/1978 | Bailey et al. | 318/370 |
| 4,352,049 | 9/1982 | Franz, Jr. | 318/370 |
| 4,471,277 | 9/1984 | Franz, Jr. | 318/376 |
| 4,675,565 | 6/1987 | Lewus | 318/786 |
| 4,812,728 | 3/1989 | Yang | 318/759 X |
| 5,063,319 | 11/1991 | Mason et al. | 310/210 |
| 5,099,184 | 3/1992 | Hornung et al. | 318/375 |
| 5,170,105 | 12/1992 | Kumar | 318/375 |

OTHER PUBLICATIONS

"Safer Power-Tool Braking", *Machine Design*, May 15, 1975, pp. 72–75.

*Primary Examiner*—Jonathan Wysocki
*Attorney, Agent, or Firm*—Michael, Best & Friedrich

[57] ABSTRACT

A universal electric motor having an arbor mounted on a rotating armature with a run winding for generating a magnetic field having a polarity relative to the armature and for rotating the arbor, a first switch for connecting the run winding to a power source, and a brake winding for generating a counter magnetic field opposed with respect to the armature winding to that generated by the run winding. The brake winding operates when energized, to stop rotation of the arbor by generating a counter magnetic field which interacts with the magnetic field of the armature. Also included is an electrical circuit for providing a residual magnetism in the stator iron to help stop the arbor rotation. The circuit includes an energy storage capacitor for providing current to the brake winding thereby helping to begin generation of the counter magnetic field, a second switch for connecting the energy storage to the brake winding when the first switch disconnects the run winding from the power source, a biasing diode for biasing the energy storage capacitor to a predetermined polarity, a rectifying resistor and diode for coupling the energy storage capacitor to the power source and an alternate discharge path for discharging the energy stored in the event that the normal discharge path is inoperative.

11 Claims, 1 Drawing Sheet

DYNAMIC BRAKE CIRCUIT FOR AN ELECTRIC MOTOR

BACKGROUND OF THE INVENTION

The invention relates to electric powered tools, and more particularly, to a dynamic brake electrical circuit for use in stopping an alternating current universal electrical motor used in power tools.

Alternating current (a.c) universal motors have been commonly used in electrically powered tools such as power saws, drills, and other types of equipment. Generally they are a high-power, light weight power source for electrical tools. The typical universal motor has a housing supporting a stator assembly and a rotatable arbor or shaft which has an armature mounted thereon. Current flowing through the run coil on the stator creates a magnetic field which interacts with the armature magnetic field which in turn drives the arbor rotationally. A tool such as a saw blade or drill bit may be mounted directly on the arbor or the arbor may be coupled to the tool by a simple gear transmission or the like.

Those skilled in the art will appreciate that universal motors have a tendency to coast, or to continue rotation of the arbor shaft for some time after electrical power is disconnected from the motor. This tendency to coast is due simply to the rotational momentum of the arbor shaft, transmission, and tool attachments. For this reason, it is sometimes desirable to equip the motor with a brake. One such brake is a regenerative dynamic discharging capacitor was to generate, and thereby guarantee the existence of, a residual magnetism in the stator iron to help assure adequate braking action. The addition of the discharge capacitor helps eliminate the "dead-zone" but can create other problems. For example, if the break coil leads break, or, more likely, the commutator brushes are worn and not in contact with the armature, the capacitor remains charged for some time creating a shock hazard to anyone attempting to service the tool. While the capacitor may be manually discharged, for example, by shorting the capacitor leads with a screwdriver blade, service personnel do not always observe this precaution. Moreover, shorting the capacitor leads in such a manner may destroy the component or decrease its effective life.

An additional problem is that conventional dynamic braking circuits have required complicated switching arrangements which necessitate more expensive and complex switches. A simplified circuit design allows the use of a less expensive switch having fewer leads and moveable parts and, therefore, having a greater degree of reliability. Thus, it is desirable to provide a dynamic braking circuit which is reliable, and inexpensive to manufacture.

SUMMARY OF THE INVENTION

The invention provides an electric motor having an arbor mounted on a rotating armature means, a run winding means for generating a magnetic field for rotating the arbor, a first switching means for connecting the run winding means to a power source, and a brake winding means for generating a residual magnetism in the form of a counter magnetic field opposed, relative to the armature field, to the field generated by the run winding means. The brake winding means is energized to stop rotation of the arbor by an electrical circuit which provides residual magnetism to stop the arbor rotation. The circuit includes an energy storage means for providing current to the brake winding means for generating the counter magnetic field, a second switching means for connecting the energy storage means to the brake winding means when the first switch means disconnects the run winding means from the power source, a biasing means for biasing the energy storage means to a predetermined polarity, rectifying means for coupling the energy storage means to the power source, and alternate discharge means for providing a discharge path for the energy storage means.

It is an object of the invention to provide a new and improved dynamic braking system for alternating current motors.

It is another object of the invention to provide a dynamic braking circuit which helps to eliminate the "dead zone" phenomena endemic to most dynamic braking circuits.

A further object of the invention is to provide a dynamic braking system for alternating current motors that is economical.

These and further objects and advantages of the invention will become apparent from the detailed description thereof taken with the accompanying drawing.

BRIEF DESCRIPTION OF THE DRAWING

The single figure of the drawing schematically illustrates the electric motor dynamic brake circuit according to the invention.

DETAILED DESCRIPTION OF THE PREFERRED EMBODIMENT

Figure 1:
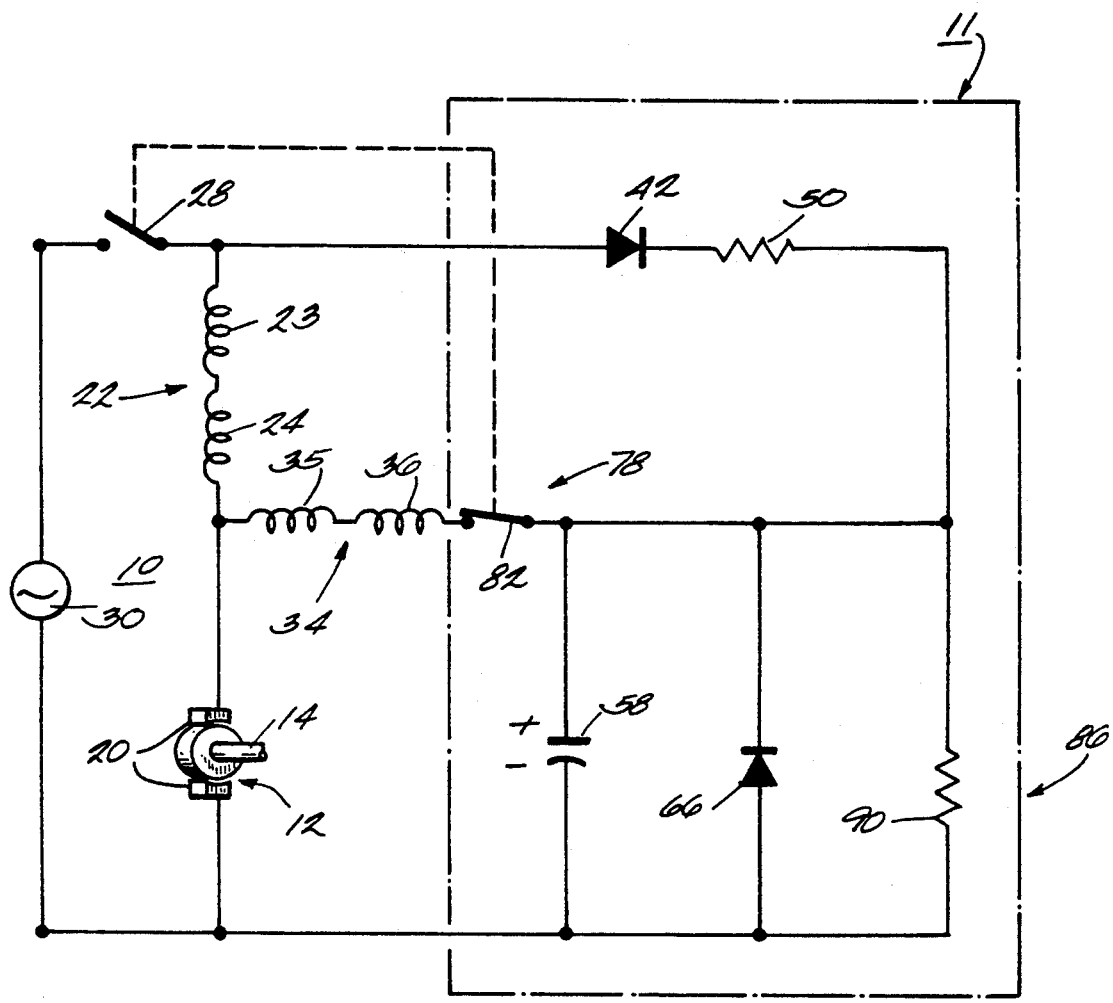

The drawing schematically illustrates an electric motor 10 and a control circuit 11. The motor 10 is conventional and its details form no part of the invention. Accordingly, the motor 10 will not be described in detail for the sake of brevity In general terms, the motor 10 includes a rotating armature 12 mounted on an arbor or rotating shaft 14 and having armature windings (not shown) for generating an armature field. Electricity is transferred to the rotating armature 12 via a pair of commutator brushes 20 in a manner that is well known in the art. The electric motor 10 also includes a stator assembly (not shown) which has a run winding means 22 for generating a magnetic field for rotating the armature 12 and arbor 14. In the preferred form of the invention, the run winding means 22 includes a pair of serially connected run windings 23 and 24. The windings 23 and 24 are electrically identical and therefore have an equal measure of inductance. However, and though electrically connected in series, they are mechanically orientated on opposite sides of the armature 12 in order to provide a magnetic field which is evenly distributed about the armature 12.

The electric motor 10 also includes a first switching means for connecting the run windings 23 and 24 to a power source 30. In the preferred embodiment, the first switching means may comprise a simple single-throw switch 28 connected in series between the a.c. power source 30 and the run windings 23 and 24. The switch 28 is selectively operable to selectively connect and disconnect the power source 30 and the run windings 23 and 24.

The electric motor 10 further includes a brake winding means 34 for generating a counter magnetic field which is opposed, with respect to the armature field, to that generated by the run windings 23 and 24. The opposed magnetic field generated by the brake winding means 34 operates to provide a magnetic force which stops the armature 12 and arbor 14 from rotating when power has been disconnected from the run windings 23 and 24. In the preferred form of the invention, the brake winding means 34 includes a pair of electrically identical windings 35 and 36 connected in series and preferably having equal inductance and resistance. Though not shown, the brake windings 35 and 36, like the run windings 23 and 24, are mechanically orientated on opposite sides of the armature 12.

The electric motor 10 further includes the control circuit 11 which discharges energy through the brake windings 35 and 36 and the armature 12 to help assure the existence of residual magnetism in the stator iron which in turn assures braking of the armature 12 and arbor 14. In the preferred form of the invention, the control circuit 11 includes a rectifying means 42 such as, for example, a diode rectifier 42 in series with a current limiting resistor 50 for rectifying the alternating current from the source 30. The rectifying means 42 may also include a full-wave or other suitable rectifier.

The control circuit 11 also includes energy storage means for providing current to the brake windings 35 and 36 when switch 82 is closed thereby assuring the existence of residual magnetism in the stator iron and generating a counter magnetic field having an opposite polarity with respect to the armature field or armature 12, to the magnetic field generated by the run windings 23 and 24. In this manner, the energy storage means energizes the brake windings 35 and 36 to aid in the initiation of the regenerative braking process which helps stop rotation of the armature 12 and arbor 14. In its preferred form, the energy storage means comprises a capacitor 58 which is serially connected to the rectifier diode 42 and the resistor 50.

Also included in the control circuit 11 is a biasing means in the form of a biasing diode 66 for biasing the capacitor 58 to a predetermined polarity. The biasing diode 66 is connected with its cathode and anode connected respectively to the positive and negative terminals of the capacitor 58. This configuration prevents the capacitor 58 from experiencing a reverse bias condition.

The control circuit 11 also includes a second switching means for connecting the capacitor to the brake windings 35 and 36. In the preferred form of the invention, the second switching means includes a second single-throw switch 82 connected in series between the brake windings 35 and 36 and the positive terminal of the capacitor 58. The second switch 82 is interlocked with the first switch 28 in any suitable manner to comprise a double-pole, single-throw (dpst) alternating action switch. Thus, when the first switch 28 is closed, connecting the run windings 23 and 24 and the capacitor 58 to the a.c. power source 30, the second switch 82 is open. On the other hand, when the switch 28 is opened to disconnect the run windings from the power source 30, switch 82 closes to connect the brake coils 35 and 36 to the capacitor 58.

The control circuit 11 also includes an alternate discharge means for providing an alternate discharge path for the capacitor 58. The alternate discharge means comprises a resistor 90 connected in parallel to the capacitor 58. The impedance of the resistor 90 is much greater than that of the brake windings 35 and 36, so that the resistor 90 is operative only when the power to the circuit 11 has been disconnected, and in the event that the current discharge path through the brake windings 35 and 36 has been interrupted. This condition could occur if one of the brake windings becomes electrically "open", or if the commutator brushes 20 cease to make contact with the armature 12, thereby preventing discharge of the energy stored in the capacitor 58 through the brake windings 35 and 36 or the armature 12. In that event, current from the capacitor 58 discharges through the resistor 90 over a period of time so that capacitor 58 does not remain dangerously charged. The time period required for discharge of the stored energy is controlled by the RC time constant of the circuit in a manner that is commonly known in the art.

In operation, when the first switch 28 is closed connecting the a.c. power source 30 to the run windings 23 and 24, a magnetic field is generated having a first polar orientation for driving the armature 12 and arbor 14 of the motor 10 in a first direction. At the same time, a.c. current from the power source 30 is half-waved rectified by rectifier 42 for charging the capacitor 58. When it is desired to stop the electric motor 10, the switches 28 and 82 are operated simultaneously to disconnect the run windings 23 and 24 from the power source 30 and the control circuit 11 and connect the charged capacitor 58 to the brake windings 35 and 36. If the brake windings 35 and 36 are electrically intact, and the brushes 20 are in contact with the armature 12, the stored charge on the capacitor 58 discharges through the brake windings 35 and 36 generating a magnetic field having a polarity, opposite with respect to the armature 12, to the polarity of the magnetic field created by the run windings 23 and 24 and operating to help stop the rotation of the armature 12 and arbor 14. When a reverse biased condition begins to develop on capacitor 58, the biasing diode 66 will begin to conduct thereby eliminating the charge. In the event that the capacitor cannot discharge through the windings 35 and 36, the stored energy in the capacitor 58 discharges through the resistor 90 to safely deplete the charge stored by the capacitor 58.

Various features of the invention are set forth in the following claims.

What is claimed is:

1. An electric motor including an arbor mounted on a rotating armature means, a stator iron, run winding means mounted on the stator iron for generating a magnetic field for rotating the arbor, first switching means for connecting the run winding means to a power source, brake winding means which is separate from said run winding means and which generates a counter magnetic field opposed, with respect to the armature, to that field generated by the run winding means, the brake winding means operating when energized to stop rotation of the arbor, and a control circuit for generating residual magnetism in the stator iron, the circuit comprising:

energy storage means for providing current to said brake winding means for generating the residual magnetism in the stator iron whereby generating said counter magnetic field;

second switching means for connecting said energy storage means to said brake winding means when said first switching means disconnects said run winding means from the power source; and alternate discharge means for providing an alternate discharge path for said energy storage means whenever said run winding means is disconnected from said power source.

2. The electric motor of claim 1 wherein said alternate discharge means includes an impedance means connected in parallel with said energy storage means to provide an alternate discharge path for energy stored in said energy storage means.

3. The electric motor set forth in claim 2 wherein said impedance means comprises a resistance.

4. The electric motor of claim 3 wherein said energy storage means includes a capacitor connected to the power source for receiving a charging current.

5. The electric motor of claim 4 wherein said first switch means is connected in series between the power source and the run winding means, said second switch means is connected in series between the brake winding means and said energy storage means, and wherein the electric motor further includes means for coupling said first and second switches so that each switch means opens when the other is closed whereby said brake winding means is connected to said energy storage means when said run winding means is disconnected from the power source.

6. The electric motor of claim 5 wherein said circuit further comprises rectifying means for coupling said capacitor to the power source.

7. The electric motor of claim 6 wherein said circuit further comprises biasing means for biasing said energy storage means to a predetermined polarity.

8. The electric motor of claim 7 wherein said biasing means includes a diode connected in parallel to said energy storage means to prevent the generation of a reverse biased potential across said energy storage means.

9. The electric motor of claim 8 wherein said first and second switch means comprise a double-pole, single-throw alternate action switch.

10. The electric motor of claim 9 wherein said rectifying means includes a resistor connected to the power source in series with a diode operating to rectify current provided by the power source.

11. An electric motor having a rotating arbor, a stator iron, run field winding means mounted on the stator iron and brake field winding means which is separate from and which is connected to said run field winding means, and an electrical circuit for generating residual magnetism in the stator iron, the circuit comprising:

capacitance means;

first switch means for coupling the run winding means and the capacitance means to a source of electrical energy;

impedance means connected to the capacitance means;

second switch means for connecting said brake field winding means to said capacitance means; and means for simultaneously operating said first and second switch means so that said brake field winding means is connected to said capacitance means only when said run field winding means is disconnected from the power source.

* * * * *

UNITED STATES PATENT AND TRADEMARK OFFICE
CERTIFICATE OF CORRECTION

PATENT NO. : 5,294,874
DATED : March 15, 1994
INVENTOR(S) : Jeffrey C. Hessenberger et al.

It is certified that error appears in the above-indentified patent and that said Letters Patent is hereby corrected as shown below:

Column 1, line 31, after "dynamic", insert ---brake. A regenerative dynamic brake uses the residual magnetism in the stator iron to induce a small voltage across the armature. This voltage results in the flow of a regenerated current which can be supplied to the run windings to produce a field that is opposite (with respect to the armature) to the field generated by the run windings during operation of the tool. The field produced by the regenerated current helps stop rotation of the armature.

One prior art dynamic brake provides a double-pole, double-throw ("spdt" or "dpst") switch to reverse the polarity of the field coil with respect to the armature. Another similar prior art solution uses a "dpdt" switch to switch the current produced by the residual magnetism through a separate brake coil on the stator. However, these braking mechanisms are unreliable since the generating action cannot start if the circuit is switched the moment the alternating field flux is at or near zero. With normal household line voltage, which has a frequency of 60 hertz, these line crossings occur approximately 120 times per second. Thus the prior art circuits have typically had a built in factor of unreliability because the regenerative dynamic brake relies on the residual magnetism left in the stator iron.

One prior art attempt to address this reliability problem was to provide a reverse current to the motor's

UNITED STATES PATENT AND TRADEMARK OFFICE
CERTIFICATE OF CORRECTION

PATENT NO. : 5,294,874
DATED : March 15, 1994
INVENTOR(S) : Jeffrey C. Hessenberger et al.

It is certified that error appears in the above-indentified patent and that said Letters Patent is hereby corrected as shown below:

run winding by discharging a charged capacitor when the motor is disconnected from the power source. The purpose of the---.

Column 4, lines 15 and 16, delete "polar orientation", and insert —polarity—.

Signed and Sealed this

Thirteenth Day of September, 1994

Attest:

BRUCE LEHMAN

Attesting Officer    Commissioner of Patents and Trademarks